(12) United States Patent
Kegasawa (10) Patent No.: US 9,075,300 B2
(45) Date of Patent: Jul. 7, 2015

(54) PROJECTOR

(71) Applicant: SEIKO EPSON CORPORATION, Tokyo (JP)

(72) Inventor: Kazuyoshi Kegasawa, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 135 days.

(21) Appl. No.: 14/017,027

(22) Filed: Sep. 3, 2013

(65) Prior Publication Data

US 2014/0063358 A1    Mar. 6, 2014

(30) Foreign Application Priority Data

Sep. 6, 2012    (JP) .................................. 2012-195809

(51) Int. Cl.
*G03B 21/20* (2006.01)
*G03B 33/12* (2006.01)
*H04N 9/31* (2006.01)

(52) U.S. Cl.
CPC ............ *G03B 21/2073* (2013.01); *G03B 33/12* (2013.01); *G03B 21/206* (2013.01); *H04N 9/3105* (2013.01); *H04N 9/3167* (2013.01); *H04N 9/3188* (2013.01)

(58) Field of Classification Search
CPC ...... G03B 21/14; G03B 21/142; G03B 21/20; G03B 21/206; G03B 21/2073; H04N 9/31; H04N 9/3105; H04N 9/3167; H04N 9/3188; G02F 1/0136; G02F 1/1313; G02F 1/133528; G02B 5/30
See application file for complete search history.

(56) References Cited

U.S. PATENT DOCUMENTS

| | | | | |
|---|---|---|---|---|
| 7,705,986 B2* | 4/2010 | Yamanaka et al. | ............ | 356/368 |
| 7,944,605 B2* | 5/2011 | Endo et al. | .................... | 359/295 |
| 8,177,367 B2* | 5/2012 | Ellinger et al. | ................... | 353/7 |
| 2005/0057726 A1* | 3/2005 | Uehara | ........................... | 353/30 |
| 2012/0069163 A1* | 3/2012 | Endo | .............................. | 348/56 |

FOREIGN PATENT DOCUMENTS

| | | |
|---|---|---|
| JP | 2004-180011 A | 6/2004 |
| JP | 2005-057457 A | 3/2005 |
| JP | 2005-091519 A | 4/2005 |
| JP | 2007-163943 A | 6/2007 |
| JP | 2012-191496 A | 10/2012 |
| JP | 2012-208216 A | 10/2012 |

* cited by examiner

*Primary Examiner* — Jori S Reilly-Diakun
(74) *Attorney, Agent, or Firm* — Maschoff Brennan (57) ABSTRACT

A projector is provided with an image forming device, a light path switching element, a polarization control element, and a polarization plate. The image forming device emits first image light and second image light. The light path switching element shifts a light path of the first image light and a light path of the second image light from each other. The polarization control element controls a polarization direction of the first image light to have a first polarization direction in a first display period, controls polarization directions of the first image light and the second image light to have a second polarization direction different from the first polarization direction in a transition period, and controls the polarization direction of the second image light to have the first polarization direction in a second display period. The polarization plate is disposed on the light exit side of the polarization control element.

9 Claims, 8 Drawing Sheets

PROJECTOR

The entire disclosure of Japanese Patent Application No. 2012-195809, filed Sep. 6, 2012, is expressly incorporated by reference herein.

BACKGROUND

1. Technical Field

The present invention relates to a projector.

2. Related Art

In recent years, regarding the improvement in performance of the projectors, the demand for the technology capable of providing high-resolution display images has been increased.

With respect to the demand, there is disclosed a configuration provided with a display element, a pixel-shifting element, and a light-blocking wheel in, for example, JP-A-2004-180011 (Document 1). The display element is composed of a plurality of pixels capable of controlling the light in accordance with image information. The pixel-shifting element optically shifts the positions of the pixels. The light-blocking wheel is a disc-like member provided with a light-blocking section and an opening section (a transmitting section). The rotation of the light-blocking wheel is controlled in accordance with the action of the pixel-shifting element. The light-blocking wheel physically blocks the light entering the display element in sync with the timing at which the display is inhibited.

In the configuration of Document 1, the light entering the display element is blocked in a transition period until the positions of the pixels are switched to thereby suppress deterioration of the image quality. However, since the light is blocked using the rotation of the light-blocking wheel, the light is gradually blocked from one end. As a result, there is a problem that the visual image quality is deteriorated.

SUMMARY

An advantage of some aspects of the invention is to provide a projector capable of suppressing the deterioration of the visual image quality.

(1) A projector according to an aspect of the invention includes an image forming device adapted to divide image light, in a time-sharing manner, into first image light corresponding to a first sub-field in which writing of first image data is performed, and second image light corresponding to a second sub-field, which is temporally contiguous to the first sub-field, and in which writing of second image data is performed, and emit the first image light and the second image light, a light path switching element adapted to shift a light path of the first image light emitted from the image forming device and a light path of the second image light from each other, a polarization control element adapted to control a polarization direction of the first image light to have a first polarization direction in a first display period in which the first image light is emitted after the writing of the first image data is completed, control polarization directions of both of the first image light and the second image light to have a second polarization direction different from the first polarization direction in a transition period until the light emitted from the image forming device is switched from the first image light to the second image light, and control the polarization direction of the second image light to have the first polarization direction in a second display period in which the second image light is emitted after the writing of the second image data is completed, a control device adapted to control the image forming device, the light path switching element, and the polarization control element, a polarization plate disposed on a light exit side of the polarization control element, and adapted to transmit light with the first polarization direction, and a projection optical system adapted to project the first image light with the first polarization direction and the second image light with the first polarization direction emitted from the polarization plate.

According to this configuration, due to the control of the polarization direction by the polarization control element, it is possible to inhibit the image light including both of the first image light and the second image light from being displayed in the transition period. In the configuration in which the light is blocked using the rotation of the light-blocking wheel as described in Document 1, the light is gradually blocked from one end. In contrast, according to this configuration, the image light can collectively be blocked. Therefore, the deterioration of the visual image quality can be suppressed.

(2) The projector according to (1) may be configured such that the light path switching element includes a polarization switching element adapted to control the polarization direction of the first image light emitted from the image forming device and the polarization direction of the second image light emitted from the image forming device to have respective predetermined polarization directions different from each other, and alternately switch the polarization direction of the first image light and the polarization direction of the second image light, and a birefringent optical element adapted to shift the light path of the first image light with a predetermined polarization direction emitted from the polarization switching element and the light path of the second image light with a predetermined polarization direction from each other.

According to this configuration, the pixel shifting is performed by the switching of the polarization direction by the polarization switching element, and thus, the high-resolution display image can be obtained.

(3) The projector according to (2) may be configured such that the light path switching element further includes a polarization rotating element disposed on the light exit side of the image forming device, and adapted to rotate a polarization direction of the image light emitted from the image forming device to uniform the polarization direction of the image light into a predetermined polarization direction.

According to this configuration, it is possible to regulate the direction of the pixel shifting to a desired direction.

(4) The projector according to (2) or (3) may be configured such that at least one of the polarization switching element and the polarization control element is a twisted nematic mode liquid crystal element.

According to this configuration, the response speed is high compared to the liquid crystal elements acting in other modes, and the tint of the display image is hard to vary.

(5) The projector according to any one of (2) through (4) may be configured such that the control device performs control of the polarization direction with the polarization control element in the transition period in sync with switching timing from the first polarization direction to the second polarization direction of the polarization switching element.

According to this configuration, the polarization direction can be controlled in sync with the switching timing of the polarization direction by the polarization switching element. Therefore, the blocking of the image light in the transition periods can surely be performed.

(6) The projector according to any one of (1) through (4) may be configured such that the control device performs control of the polarization direction with the polarization control element in the transition period in sync with timing of start of switching from the first sub-field to the second sub-field.

According to this configuration, the polarization direction can be controlled in sync with the timing of the start of the switching between the sub-fields. Therefore, the blocking of the image light in the transition periods can surely be performed.

(7) The projector according to any one of (1) through (6) may be configured such that the polarization plate absorbs light with the second polarization direction.

According to this configuration, in the transition periods, by absorbing the image light, the display image can collectively be blocked.

(8) The projector according to any one of (1) through (6) may be configured such that the polarization plate reflects the first image light in the second polarization direction and the second image light in the second polarization direction and the projector further includes a light receiving element adapted to receive the first image light with the second polarization direction and the second image light with the second polarization direction reflected by the polarization plate.

According to this configuration, the light intensity of the image light making no contribution to the display can be detected.

(9) The projector according to anyone of (1) through (8) may be configured such that the image forming device includes a light source adapted to emit light, and a light modulation element adapted to modulate the light emitted from the light source based on first image data corresponding to the first sub-field and emit the modulated light as the first image light, and modulate the light emitted from the light source based on second image data corresponding to the second sub-field and emit the modulated light as the second image light.

According to this configuration, it is possible to realize the image forming device for emitting the image light corresponding to each of the sub-fields.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be explained with reference to FIGS. 1 through 6.

In the present embodiment, a so-called three-panel liquid crystal projector using three sets of transmissive liquid crystal light valves as the light modulation element will be described as an example.

Figure 1:
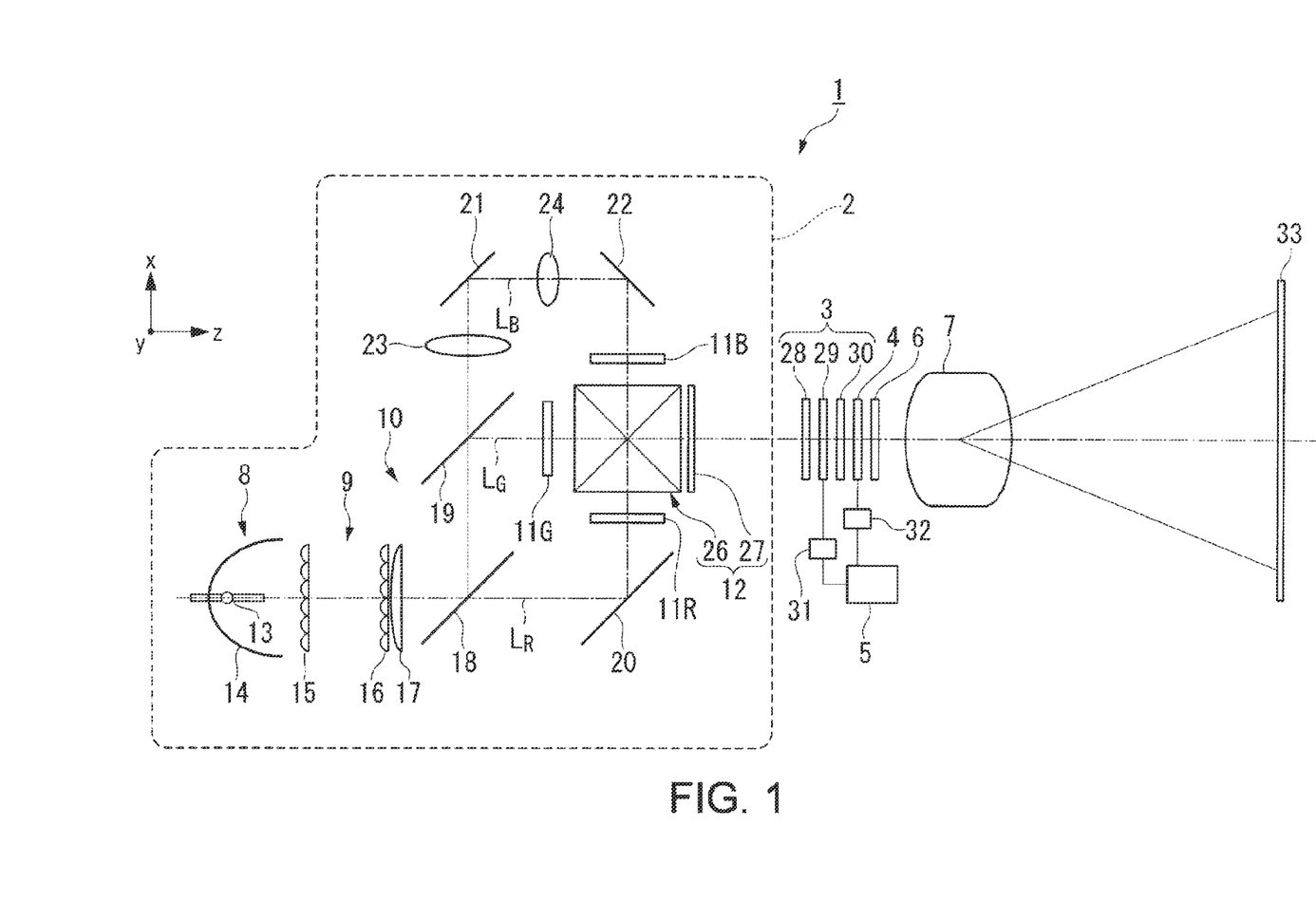
FIG. 1 is a diagram showing a schematic configuration of a projector according to a first embodiment of the invention.
Figure 2:
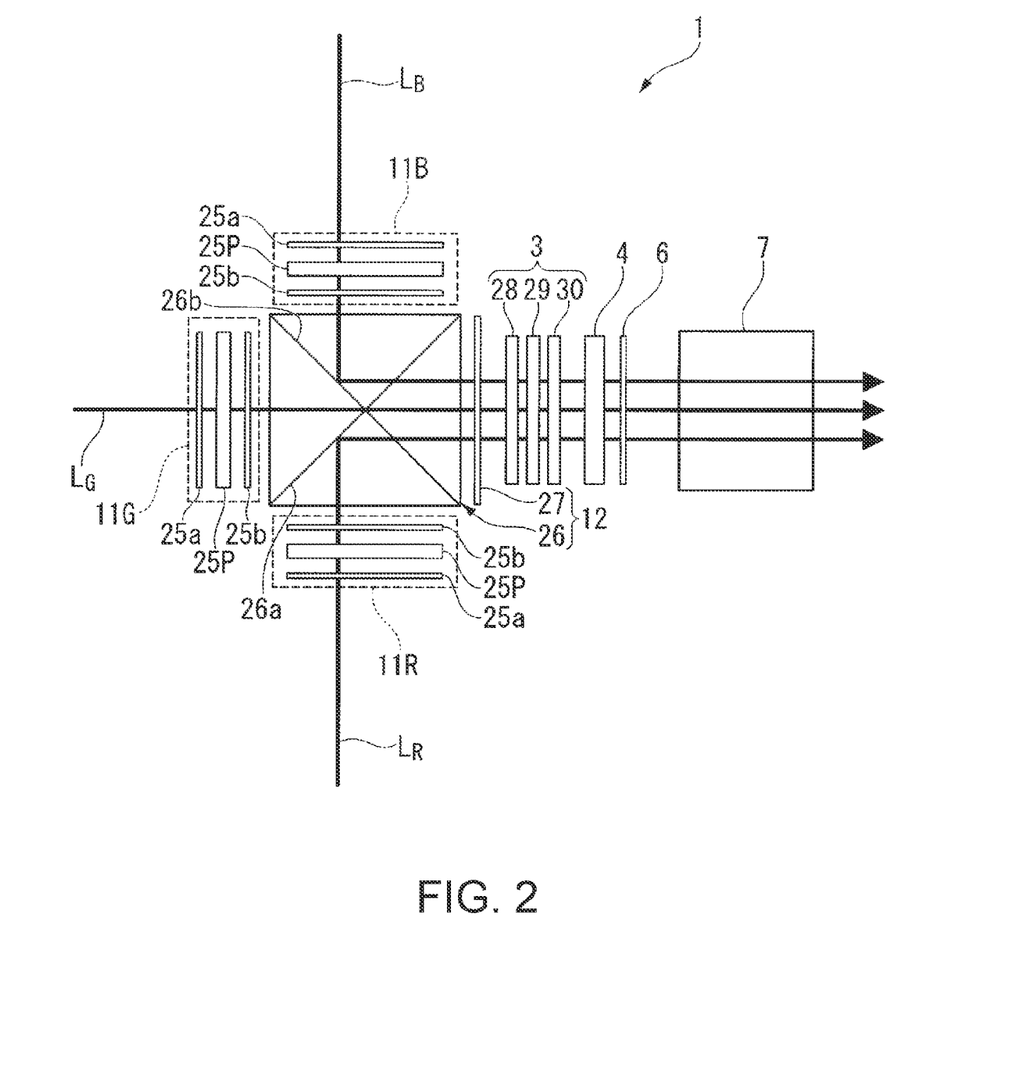
FIG. 2 is a diagram showing an essential part of the projector according to the first embodiment.

FIG. 1 is a schematic configuration diagram of the projector according to the present embodiment. FIG. 2 is a diagram showing an essential part of the projector 1.

As shown in FIG. 1, the projector 1 according to the present embodiment is provided with an image forming device 2, a light path switching element 3, a polarization control element 4, a control device 5, a polarization plate 6, and a projection optical system 7. The control device 5 performs the overall control of the image forming device 2, the light path switching element 3, and the polarization control element 4.

Hereinafter, each of the components of the projector 1 will be explained.

The image forming device 2 is provided with a light source 8, an integrator optical system 9, a colored light separation/guiding optical system 10, three liquid crystal light valves 11R, 11G, and 11B (light modulation elements), and a colored light combining optical system 12. The image forming device 2 is connected to the control device 5 via a drive circuit not shown.

The light source 8 is formed of a super-high pressure mercury lamp, a xenon lamp, or the like. The light source 8 is provided with a light source lamp 13 and a reflector 14. The light source lamp 13 emits white light. The reflector 14 reflects the light from the light source lamp 13, and emits the light toward the integrator optical system 9.

The integrator optical system 9 is provided with a first lens array 15, a second lens array 16, and an overlapping lens 17. The first lens array 15 and the second lens array 16 are each formed of a fly-eye lens or the like. The integrator optical system 9 roughly homogenizes the illuminance distribution of the light emitted from the light source 8 on each of the liquid crystal light valves 11R, 11G, and 11B.

The colored light separation/guiding optical system 10 is provided with dichroic mirrors 18, 19, reflecting mirrors 20, 21, 22, an entrance side lens 23, and a relay lens 24. The dichroic mirrors 18, 19 selectively reflect the colored light in a predetermined wavelength band included in the white light entered, and transmit the colored light in the other wavelength band.

Specifically, the dichroic mirror 18 reflects the green light LG and the blue light LB while transmitting the red light LR. The dichroic mirror 19 reflects the green light LG toward the green light modulating liquid crystal light valve 11G while transmitting the blue light LB out of the colored light reflected by the dichroic mirror 18. The reflecting mirror 20 reflects the red light LR, which has been transmitted through the dichroic mirror 18, toward the red light modulating liquid crystal light valve 11R.

The entrance side lens 23, the reflecting mirror 21, the relay lens 24, and the reflecting mirror 22 guide the blue light LB, which has been transmitted through the dichroic mirror 19, to the blue light modulating liquid crystal light valve 11B. The entrance side lens 23 makes the light enter the relay lens 24 with efficiency. The relay lens 24 transmits the light adjacent to the entrance side lens 23 to the blue light modulating liquid crystal light valve 11B. Thus, the blue light LB having entered the entrance side lens 23 is transmitted to the blue light modulating liquid crystal light valve 11B, which is spatially distant, in the condition in which the light intensity distribution is roughly maintained without substantial light loss.

As shown in FIG. 2, each of the liquid crystal light valves 11R, 11G, and 11B is provided with an entrance side polarization plate, a liquid crystal panel, and an exit side polarization plate. For example, the red light modulating liquid crystal light valve 11R is provided with the entrance side polarization plate 25a, the liquid crystal panel 25P, and the exit side polarization plate 25b. The liquid crystal panel 25P is provided with a pair of substrates, and a liquid crystal sandwiched between the pair of substrates. The liquid crystal panel 25P has a plurality of pixels arranged in a matrix, and the transmittance of each of the pixels can independently be controlled. In the light transmission region of the liquid crystal panel 25P, there are disposed a plurality of scan lines and a plurality of data lines so as to intersect with each other. The configuration of each of the green light modulating liquid crystal light valve 11G and the blue light modulating liquid crystal light valve 11B is roughly the same as the configuration of the red light modulating liquid crystal light valve 11R.

For example, the red-light modulating liquid crystal light valve 11R performs the light modulation on the red light, which has been input thereto, based on the image data to thereby emit the image light representing the optical image. The action of each of the green light modulating liquid crystal light valve 11G and the blue light modulating liquid crystal light valve 11B is roughly the same as the action of the red light modulating liquid crystal light valve 11R.

The projector 1 according to the present embodiment adopts a line sequential drive system. In the line sequential drive system, the image data is supplied to the plurality of data lines, and the plurality of scan lines is driven sequentially from one side to the other side. In other wards, the scan lines are scanned in a line-sequential manner. Thus, the image data is written sequentially to the plurality of pixels (a pixel group) arranged in the row direction corresponding to each of the scan lines.

In the present embodiment, unit image data is composed of first image data and second image data. Here, the unit image data denotes the image data corresponding to one field. The first image data denotes the image data corresponding to a first sub-field. The second image data denotes the image data corresponding to a second sub-field temporally contiguous to the first sub-field. It should be noted that a field rate (period) of each of the sub-fields will be described later.

The first image data is written to each of the liquid crystal light valves in a line-sequential manner. The second image data is written in a period temporally contiguous to a period in which the first image data is written in a line sequential manner. The writing operation described above is repeated, and thus the first image data and the second image data are written alternately to each of the liquid crystal light valves. Each of the liquid crystal light valves modulates the incident light based on the first image data thus written, and then emits the light thus modulated as first image light, and at the same time, modulates the incident light based on the second image data, and then emits the light thus modulated as second image light.

The colored light combining optical system 12 is provided with a cross dichroic prism 26 and a color-selective polarization conversion element 27. The cross dichroic prism 26 is obtained by bonding four triangular prisms to each other. The surfaces bonded to each other in the triangular prisms form the selective reflecting planes of the cross dichroic prism 26.

As shown in FIG. 2, on the internal surfaces of the cross dichroic prism 26, there are formed a first selectively reflecting surface 26a and a second selectively reflecting surface 26b perpendicular to each other. The first selectively reflecting surface 26a is a surface reflecting the red light LR and transmitting the green light LG. The second selectively reflecting surface 26b is a surface reflecting the blue light LB and transmitting the green light LG.

The green light LG having entered the cross dichroic prism 26 passes through the selectively reflecting surfaces 26a, 26b, and is emitted directly. The red light LR having entered the cross dichroic prism 26 is selectively reflected by the first selectively reflecting surface 26a, and is then emitted in the same direction as the emission direction of the green light LG. The blue light LB having entered the cross dichroic prism 26 is selectively reflected by the second selectively reflecting surface 26b, and is then emitted in the same direction as the emission direction of the green light LG.

The color-selective polarization conversion element 27 selectively converts the polarization state of the colored light in a specific wavelength band in the incident light. The image light emitted from each of the liquid crystal light valves 11R, 11G, and 11B is linearly polarized light having been transmitted through the exit side polarization plate (see FIG. 2). The polarization state of each of the colored lights is determined taking the efficiency in combining the colored lights in the cross dichroic prism into consideration. For example, the green light LG enters the cross dichroic prism in the state of the P-polarized light, and the red light LR and the blue light LB enter the cross dichroic prism in the state of the S-polarized light, and the green light LG, the red light LR, and the blue light LB are combined into the image light for forming a color image, and then emitted. The image light emitted from the cross dichroic prism enters the color-selective polarization conversion element 27. On this occasion, the polarization direction of the green light LG alone is rotated 90°, and the green light LG turns out to be S-polarized light. Thus, the image light composed of the three colored lights having the uniform polarization state is output from the color-selective polarization conversion element 27.

It should be noted that it is also possible to adopt a configuration in which the colored lights LR, LG, and LB emitted from the respective liquid crystal light valves 11R, 11G, and 11B after being transmitted through the respective exit side polarization plates (see FIG. 2) all become the linearly polarized lights in the same polarization state (e.g., the S-polarized light). Further, in the case in which the polarization states of the respective colored lights have already been uniformed in the anterior stage of the cross dichroic prism 26, the color-selective polarization conversion element 27 is unnecessary.

As described above, the three colored lights are combined by the colored light combining optical system 12, and thus, the light representing a color image is formed. The image light thus combined is emitted toward the light path switching element 3.

The image forming device 2 according to the present embodiment divides the image light into the first image light and the second image light in a time-sharing manner, and then emits the first image light and the second image light. Here, the first image light denotes the image light corresponding to the first sub-field. The second image light denotes the image light corresponding to the second sub-field.

Figure 3:
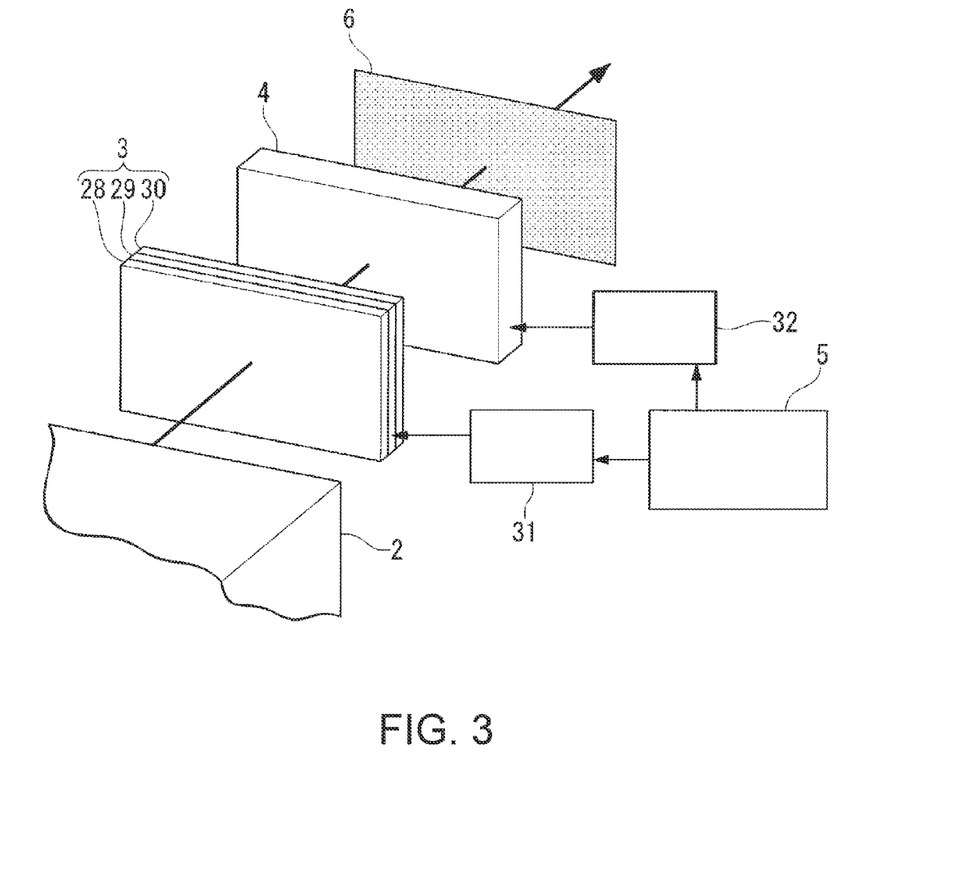
FIG. 3 is an enlarged view showing a light path switching element, a polarization control element, a control device, and a polarization plate according to the first embodiment.

FIG. 3 is an enlarged view showing the light path switching element 3, the polarization control element 4, the control device 5, and the polarization plate 6.

As shown in FIG. 3, the light path switching element 3 is provided with a polarization rotating element 28, a polarization switching element 29, and a birefringent optical element 30. The light path switching element 3 shifts the light path of the first image light emitted from the image forming device 2 and the light path of the second image light emitted from the image forming device 2 from each other. Thus, the first image light and the second image light are alternately emitted from the light path switching element 3.

The polarization rotating element 28 is disposed on the light exit side of the image forming device 2. The polarization rotating element 28 uniforms the polarization direction of the first image light and the polarization direction of the second image light into a predetermined polarization direction.

Hereinafter, the direction of the pixel shifting will be explained.

The pixels are shifted in a direction (hereinafter referred to as P1xy) of an optical axis P1 (see FIGS. 4A and 4B) of the birefringent optical element 30 described later viewed from the xy plane. Therefore, in the case of shifting the pixels obliquely at 45°, P1xy is required to be tilted obliquely at 45°.

In the birefringent optical element 30, the polarized light (hereinafter referred to as ordinary light) having a direction perpendicular to P1xy goes straight while the polarized light (hereinafter referred to as extraordinary light) having a direction parallel to P1xy is refracted. The polarization rotating element 28 of the present embodiment uniforms the direction of the first image light into a direction perpendicular to P1xy to form the ordinary light, and uniforms the direction of the second image light into a direction parallel to P1xy to form the extraordinary light.

It should be noted that it is also possible to uniform the direction of the first image light into a direction parallel to P1xy to form the extraordinary light, and uniform the direction of the second image light into a direction perpendicular to P1xy to form the ordinary light.

Figure 5:
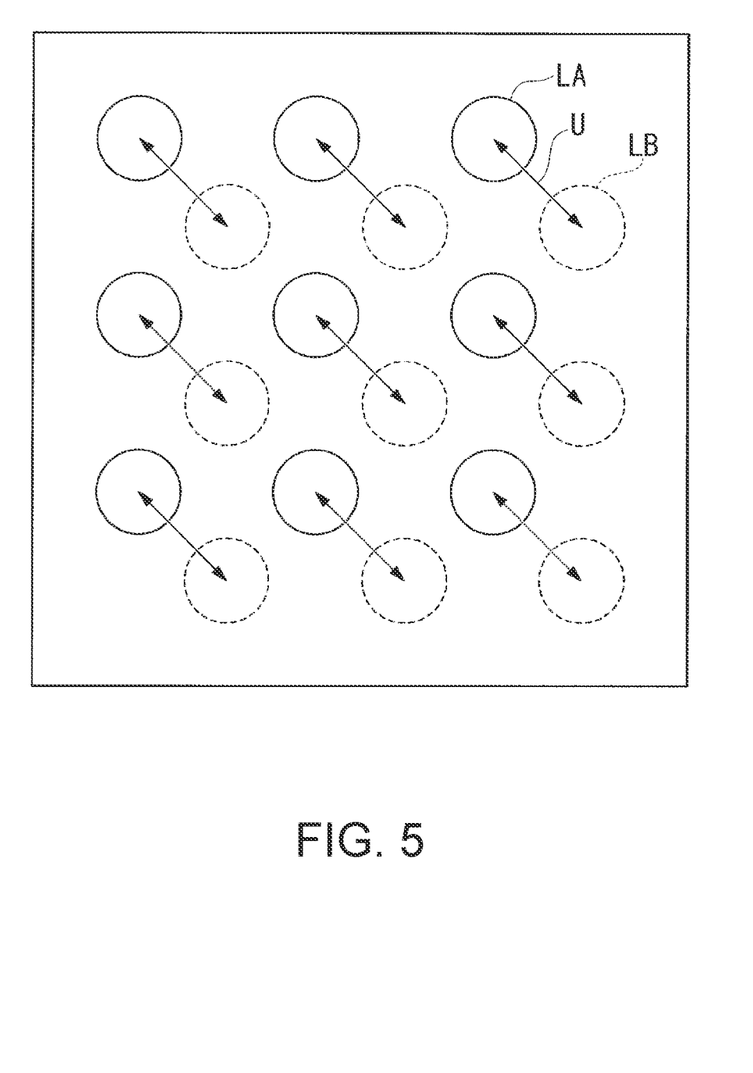
FIG. 5 is a diagram for explaining an action of the light path switching element.

In FIG. 5, the direction U of the pixel shifting is set to an obliquely downward direction (e.g., a direction tilted obliquely at 45°).

For example, an amplitude (a shift amount) of the pixel shifting is set to 1/√2 pixel pitch. In this case, the display image in the second sub-field is disposed at a position shifted ½ pixel in the horizontal direction and shifted ½ pixel in the vertical direction with respect to the display image in the first sub-field.

It should be noted that the direction of the pixel shifting is not limited to the obliquely downward direction, but can be set to a variety of directions such as a horizontal direction or a vertical direction.

As shown in FIG. 3, the polarization switching element 29 is connected to the control device 5 via a polarization switching drive circuit 31.

The polarization switching element 29 controls the polarization direction of the first image light emitted from the polarization rotating element 28 and the polarization direction of the second image light emitted from the polarization rotating element 28 to have respective predetermined polarization directions different from each other, and alternately switches the polarization direction of the first image light and the polarization direction of the second image light.

The polarization switching element 29 of the present embodiment uniforms the predetermined polarization direction, which the first image light is controlled to have, into a direction perpendicular to P1xy to thereby correspond to the ordinary light, and uniforms the predetermined polarization direction, which the second image light is controlled to have, into a direction parallel to P1xy to thereby correspond to the extraordinary light.

It should be noted that in the case in which the image light emitted from the polarization rotating element 28 is either one of the ordinary light and the extraordinary light, it is also possible to adopt a configuration in which the polarization switching element 29 emits the first image light as the ordinary light without changing the polarization direction of the first image light, and emits the second image light as the extraordinary light after changing the polarization direction of the second image light.

Further, it is also possible to adopt a configuration in which the polarization rotating element 28 uniforms the polarization directions of the respective image lights into appropriate directions so that the image lights emitted from the polarization switching element 29 correspond to the ordinary light and the extraordinary light, respectively.

The polarization switching element 29 of the present embodiment is a liquid crystal element acting in a twisted nematic mode (TN mode).

It should be noted that liquid crystal elements acting in other modes such as a vertical alignment mode (a VA mode) can also be adopted as the polarization switching element 29. It should also be noted that the TN-mode liquid crystal element is high in response speed compared to the liquid crystal elements acting in other modes, and the tint of the display image with the TN-mode liquid crystal element is hard to vary. From such a viewpoint, it is preferable to adopt the TN-mode liquid crystal element as the polarization switching element 29.

The birefringent optical element 30 is disposed on the light exit side of the polarization switching element 29. The birefringent optical element 30 is formed of a material having the refractive index anisotropy such as calcite, a quartz crystal, a liquid crystal cell having the liquid crystal oriented, or a polymer alignment body. The birefringent optical element 30 develops the refractive operation different in accordance with the polarization direction of the incident light. Due to the action described above, the birefringent optical element 30 shifts the light path of the light input from the polarization switching element 29 in accordance with the polarization direction thereof, and then emits the incident light from the different position on the exit end surface.

It should be noted that in FIGS. 1 and 2, the polarization switching element 29 and the birefringent optical element 30 are shown separately from each other for the sake of convenience. It should be noted that in the case in which an intermediate image by the image lights from the respective liquid crystal light valves 11R, 11G, and 11B is imaged on the polarization switching element 29, it is preferable to dispose the birefringent optical element 30 at a position extremely adjacent to the polarization switching element 29 as shown in FIG. 3. For example, it is preferable to dispose the birefringent optical element 30 closely to the polarization switching element 29. Thus, the light path can be changed at a position extremely adjacent to the intermediate image. Therefore, the image quality deterioration in the projection display can be suppressed, and thus, the high-resolution image display with high image quality can be realized.

Figure 4A:
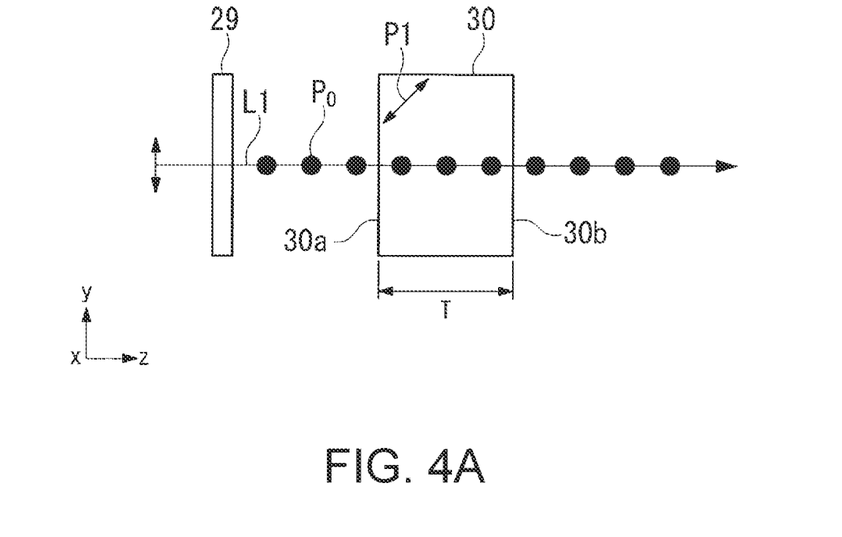
FIGS. 4A and 4B are diagrams for explaining an action of the birefringent optical element.
Figure 4B:
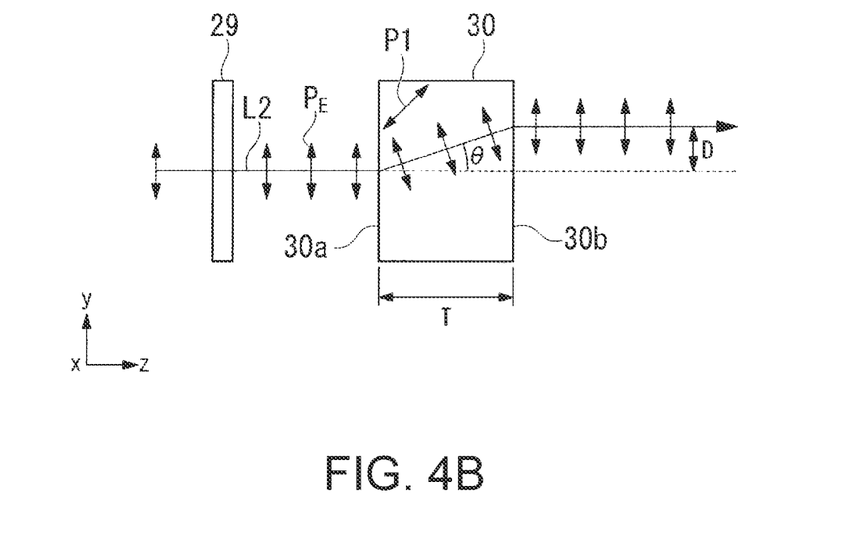

Here, the behavior of the image light having entered the birefringent optical element 30 will be explained using FIGS. 4A and 4B. FIGS. 4A and 4B are diagrams for explaining an action of the birefringent optical element 30. In FIGS. 4A and 4B, it is assumed that the optical axis P1 of the birefringent optical element 30 is disposed in a plane parallel to the sheet of the drawing. In FIG. 4A, the polarized light L1 entering the birefringent optical element 30 is the ordinary light, and the polarization direction $P_O$ thereof is perpendicular to the sheet of the drawing. In FIG. 4B, the polarized light L2 entering the birefringent optical element 30 is the extraordinary light, and the polarization direction $P_E$ thereof is parallel to the sheet of the drawing.

As shown in FIG. 4A, in the case in which the optical axis P1 of the birefringent optical element 30 does not exist in the polarization plane (the plane including the polarization direction $P_O$ and the center axis of the incident light) of the polarized light L1 input thereto, the polarized light L1 input thereto is emitted without changing the light path thereof. On the other hand, as shown in FIG. 4B, if the optical axis P1 of the birefringent optical element 30 exists in the polarization plane (the plane including the polarization direction $P_E$ and the center axis of the incident light) of the polarized light L2 input thereto, the polarized light L2 input thereto is emitted with the light path changed in accordance with the deflection angle θ due to the difference between the ordinary index and the extraordinary index of the birefringent optical element 30. Therefore, in this example, the ordinary light is emitted without changing the light path thereof, and the extraordinary light is emitted with the light path thereof changed.

Here, in the case in which the entrance end surface 30a and the exit end surface 30b of the birefringent optical element 30 with the thickness T are formed in a parallel state, the polarized light having entered the entrance end surface 30a is emitted from the exit end surface 30b in the state in which the light path thereof is translated as much as a shift amount D. The shift amount D depends on the deflection angle θ and the thickness T, and is expressed as D=T·tan θ.

Therefore, in the case in which the first image light is emitted as the ordinary light from the polarization switching element 29, and the second image light is emitted as the extraordinary light from the polarization switching element 29, the first image light having entered the birefringent optical element 30 in the state of the ordinary light is emitted without changing the light path thereof. In contrast, the second image light having entered the birefringent optical element 30 in the state of the extraordinary light is emitted in the state in which the light path thereof is translated as much as the shift amount D.

For example, the shift amount D is set to a half of the pixel pitch in the oblique direction in each of the liquid crystal light valves 11R, 11G, and 11B. In this case, as shown in FIG. 5, it results that the image light of the first sub-field and the image light of the second sub-field are displayed at the positions shifted a half of the pixel pitch in the oblique direction from each other.

As shown in FIG. 3, the polarization control element 4 is connected to the control device 5 via a polarization control drive circuit 32. The polarization control element 4 is provided with, for example, a pair of substrates, transparent electrodes formed on the respective inner surfaces of the pair of substrates, and the liquid crystal sandwiched between the pair of substrates.

The polarization control element 4 determines whether or not a voltage is to be applied based on the control information from the control device 5, and then controls whether or not the phase difference of a half wavelength is to be generated in accordance with the determination result. For example, the polarization control element 4 generates the phase difference of a half wavelength in the case of applying the voltage (ON state). In contrast, the polarization control element 4 does not generate the phase difference of a half wavelength in the case in which the voltage is not applied (OFF state).

The polarization control element 4 controls the polarization direction of the first image light to have a first polarization direction in a first display period, controls the polarization directions of the both of the first image light and the second image light to have a second polarization direction in a transition period, and controls the polarization direction of the second image light to have the first polarization direction in a second display period. It should be noted that the first display period, the transition period, the second display period, and control timing of the polarization control element 4 according to the present embodiment will be described later.

The polarization control element 4 of the present embodiment is a TN-mode liquid crystal element.

It should be noted that liquid crystal elements acting in other modes such as the VA mode can also be adopted as the polarization control element 4. It should also be noted that the TN-mode liquid crystal element is high in response speed compared to the liquid crystal elements acting in other modes, and the tint of the display image with the TN-mode liquid crystal element is hard to vary. From such a viewpoint, it is preferable to adopt the TN-mode liquid crystal element as the polarization control element 4.

The polarization plate 6 is disposed on the light exit side of the polarization control element 4. The polarization plate 6 has a transmission axis parallel to the first polarization direction. The polarization plate 6 has an absorption axis parallel to the second polarization direction. The polarization plate 6 transmits the image light with the first polarization direction and absorbs the image light with the second polarization direction out of the image light emitted from the polarization control element 4.

The projection optical system 7 projects the first image light with the first polarization direction and the second image light with the first polarization direction emitted from the polarization plate 6 on a screen 33. Thus, an image is displayed on the screen 33 in an enlarged manner.

Then, the control timing of the polarization direction by the polarization control element 4 according to the present embodiment will be explained using FIG. 6.

Figure 6:
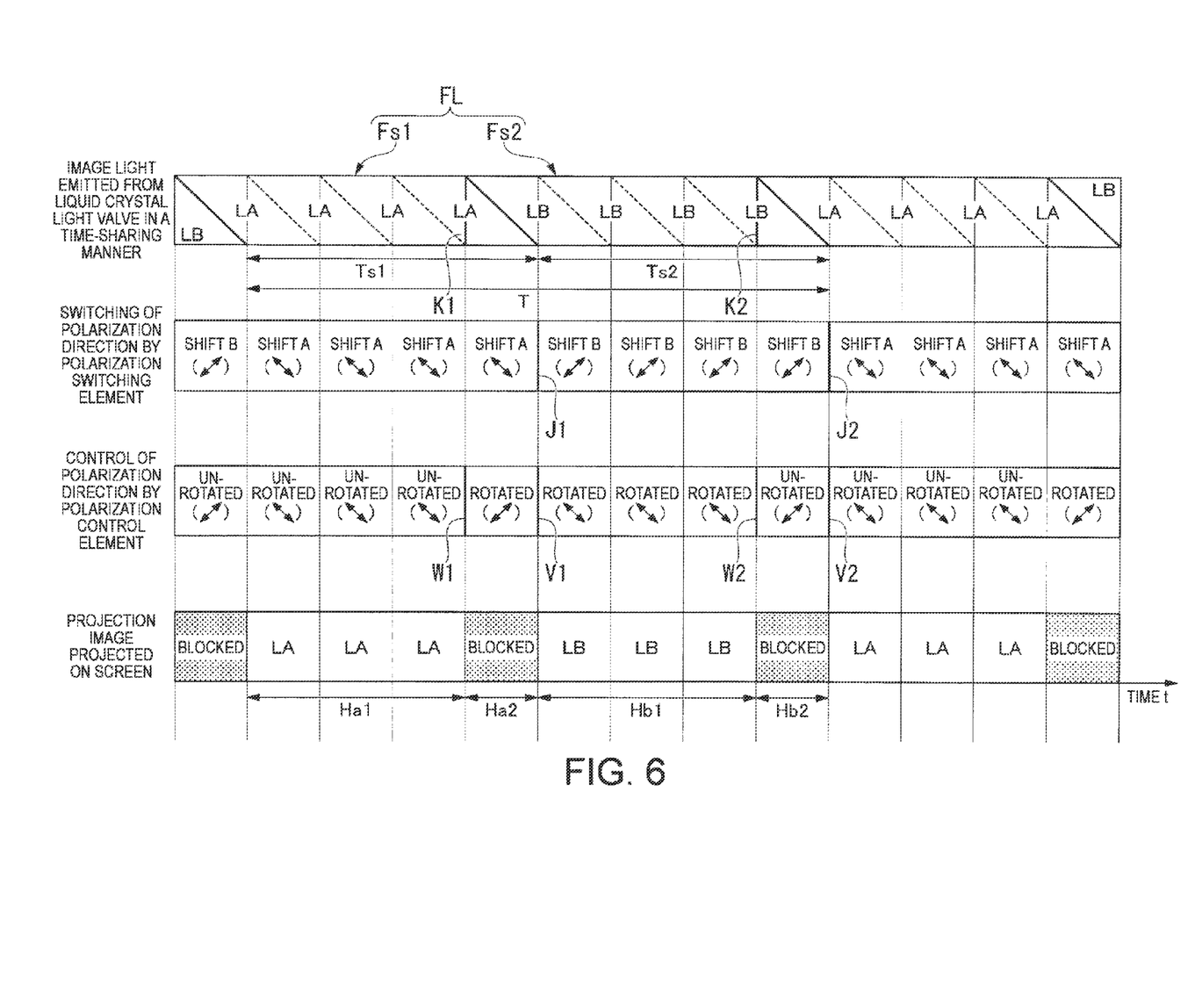
FIG. 6 is a diagram showing the control timing of the polarization direction by the polarization control element.

In FIG. 6, the horizontal axis represents time t. A first row of FIG. 6 shows the image light entering the light path switching element 3, namely the first image light LA and the second image light LB alternately emitted from the image forming device 2 (the liquid crystal light valves) in a time-sharing manner. A second row of FIG. 6 shows the switching of the polarization direction by the polarization switching element 29. A third row of FIG. 6 shows the control of the polarization direction by the polarization control element 4. A fourth row of FIG. 6 shows the projection image projected on the screen 33.

In FIG. 6, the reference symbol FL denotes a unit field. The reference symbol Fs1 denotes the first sub-field in which the first image data is written to the image forming device 2. The reference symbol Fs2 denotes the second sub-field in which the second image data is written to the image forming device 2. The reference symbol T denotes the period of the unit field. The reference symbol Ts1 denotes the period of the first sub-field. The reference symbol Ts2 denotes the period of the second sub-field. The reference symbol Ha1 denotes the first display period in which the first image light is emitted (the image based on the first image data is displayed) after the writing of the first image data is completed. The reference symbol Ha2 denotes a first transition period in which the light emitted from the image forming device 2 is switched from the first image light LA to the second image light LB. The reference symbol Hb1 denotes the second display period in which the second image light is emitted (the image based on the second image data is displayed) after the writing of the second image data is completed. The reference symbol Hb2 denotes a second transition period in which the light emitted from the image forming device 2 is switched from the second image light LB to the first image light LA. The transition periods are each a period for switching the emitted light, namely a period for writing.

For example, the period T of the unit field is 1/60=16.7 millisecond. The period Ts1 of the first sub-field is 1/120=8.3 millisecond. The period Ts2 of the second sub-field is $1/120=8.3$ millisecond. The period of the first display period Ha1 is $1/160=6.3$ millisecond. The period of the first transition period Ha2 is $1/480=2.1$ millisecond. The period of the second display period Hb1 is $1/160=6.3$ millisecond. The period of the second transition period Hb2 is $1/480=2.1$ millisecond.

As shown in the first row of FIG. 6, the first image light LA with the period Ts1 and the second image light LB with the period Ts2 are emitted from the liquid crystal light valves alternately in a time-sharing manner. By displaying the two sub-fields in the period of the unit field as short as about 16.7 millisecond, a single high-resolution image is visually recognized due to the afterimage effect of the human eyes.

The same image data is written four times in one sub-field. In the transition period, both of the first image light LA and the second image light LB exist on each of the liquid crystal light valves. For example, in the first transition period Ha2, both of the first image light LA (the image light before rewriting) in the first sub-field Fs1 (the sub-field before rewriting) and the second image light LB (the image light with which the rewriting is newly performed) in the second sub-field Fs2 (the sub-field in which the rewriting is newly performed) exist at the same time.

As shown in the second row of FIG. 6, in the period Ts1, the polarization switching element 29 switches the polarization direction of the first image light LA emitted from the liquid crystal light valves to the first polarization direction (the downward right oblique arrow) (SHIFT A). In the period Ts2, the polarization switching element 29 switches the polarization direction of the second image light LB emitted from the liquid crystal light valves to the second polarization direction (the upward right oblique arrow) (SHIFT B). Thus, as shown in FIGS. 4A and 4B, the light path of the first image light LA with the first polarization direction and the light path of the second image light LB with the second polarization direction are shifted from each other by the birefringent optical element 30.

As shown in the third row of FIG. 6, in the first display period Ha1, the polarization control element 4 controls the polarization direction of the first image light LA to have the first polarization direction (the downward right oblique arrow). In the present embodiment, in the first display period Ha1, the polarization direction of the first image light LA is controlled to be kept in the polarization direction switched by the polarization switching element 29 (UNROTATED). Thus, in the first display period Ha1, the polarization direction of the first image light LA is uniformed into a direction parallel to the transmission axis of the polarization plate 6 described above.

In the first transition period Ha2, the polarization control element 4 controls the polarization directions of both of the first image light LA and the second image light LB to have the second polarization direction (the upward right oblique arrow). In the present embodiment, in the first transition period Ha2, the polarization direction of the first image light LA is controlled to rotate 90° with respect to the polarization direction switched by the polarization switching element 29 (ROTATED). Thus, in the first transition period Ha2, the polarization directions of both of the first image light LA and the second image light LB are uniformed into a direction parallel to the absorption axis of the polarization plate 6 described above.

In the second display period Hb1, the polarization control element 4 controls the polarization direction of the second image light LB to have the first polarization direction (the downward right oblique arrow). In the present embodiment, in the second display period Hb1, the polarization direction of the second image light LB is controlled to rotate 90° with respect to the polarization direction switched by the polarization switching element 29 (ROTATED). Thus, in the second display period Hb1, the polarization direction of the second image light LB is uniformed into a direction parallel to the transmission axis of the polarization plate 6 described above.

In the second transition period Hb2, the polarization control element 4 controls the polarization directions of both of the first image light LA and the second image light LB to have the second polarization direction. In the present embodiment, in the second transition period Hb2, the polarization direction of the second image light LB is controlled to be kept in the polarization direction switched by the polarization switching element 29 (UNROTATED). Thus, in the second transition period Hb2, the polarization directions of both of the first image light LA and the second image light LB are uniformed into a direction parallel to the absorption axis of the polarization plate 6 described above.

As shown in the fourth row of FIG. 6, the first image light LA and the second image light LB are projected on the screen 33 alternately with the light-blocking state intervening therebetween in a time-sharing manner.

Specifically, in the first display period Ha1, the first image light LA is projected on the screen 33. In the first transition period Ha2, the first image light LA and the second image light LB are blocked by the polarization plate 6. In the second display period Hb1, the second image light LB is projected on the screen 33. In the second transition period Hb2, the first image light LA and the second image light LB are blocked by the polarization plate 6.

Thus, in each of the first transition period Ha2 and the second transition period Hb2, it is possible to inhibit the image light including both of the first image light LA and the second image light LB from being displayed on the screen 33.

As the control of the polarization direction by the polarization control element 4 according to the present embodiment, the following control can be adopted.

The control device 5 performs the control of the polarization direction with the polarization control element 4 in the first transition period Ha2 in sync with the timing K1 of the start of the switching from the first sub-field to the second sub-field. The control device 5 performs the control of the polarization direction with the polarization control element 4 in the second transition period Hb2 in sync with the timing K2 of the start of the switching from the second sub-field to the first sub-field.

Specifically, in each of the first transition period Ha2 and the second transition period Hb2, the timing W1, W2 at which the control of the polarization direction by the polarization control element 4 starts and the timing K1, K2 of the start of the switching between the sub-fields are synchronized with each other. For example, the synchronization is performed by synchronizing the drive signal to be transmitted to the polarization control element 4 via the polarization control drive circuit 32 with the drive signal to be transmitted to the liquid crystal light valves.

Thus, the polarization direction can be controlled in sync with the timing K1, K2 of the start of the switching between the sub-fields. Therefore, the blocking of the image light in the transition periods Ha2, Hb2 can surely be performed.

It should be noted that, as a result, in each of the first transition period Ha2 and the second transition period Hb2, the timing V1, V2 at which the control of the polarization direction by the polarization control element 4 is newly switched and the switching timing J1, J2 of the polarization direction by the polarization switching element 29 coincide with each other.

As explained hereinabove, according to the projector 1 related to the present embodiment, due to the control of the polarization direction by the polarization control element 4, in each of the first transition period Ha2 and the second transition period Hb2, it is possible to inhibit the image light including both of the first image light LA and the second image light LB from being displayed on the screen 33. In the configuration in which the light is blocked using the rotation of the light-blocking wheel as described in Document 1, the light is gradually blocked from one end. In contrast, according to the present embodiment, the image light can collectively be blocked. Therefore, the deterioration of the visual image quality can be suppressed.

Further, in Document 1, since the light-blocking wheel occupies a physical space, it is necessary to increase the size of the housing of the projector. In contrast, in the present embodiment, since the space for disposing the light-blocking wheel is not required, it is unnecessary to increase the size of the housing of the projector. Therefore, according to the present embodiment, growth in size of the projector 1 can be prevented.

Second Embodiment

Figure 7:
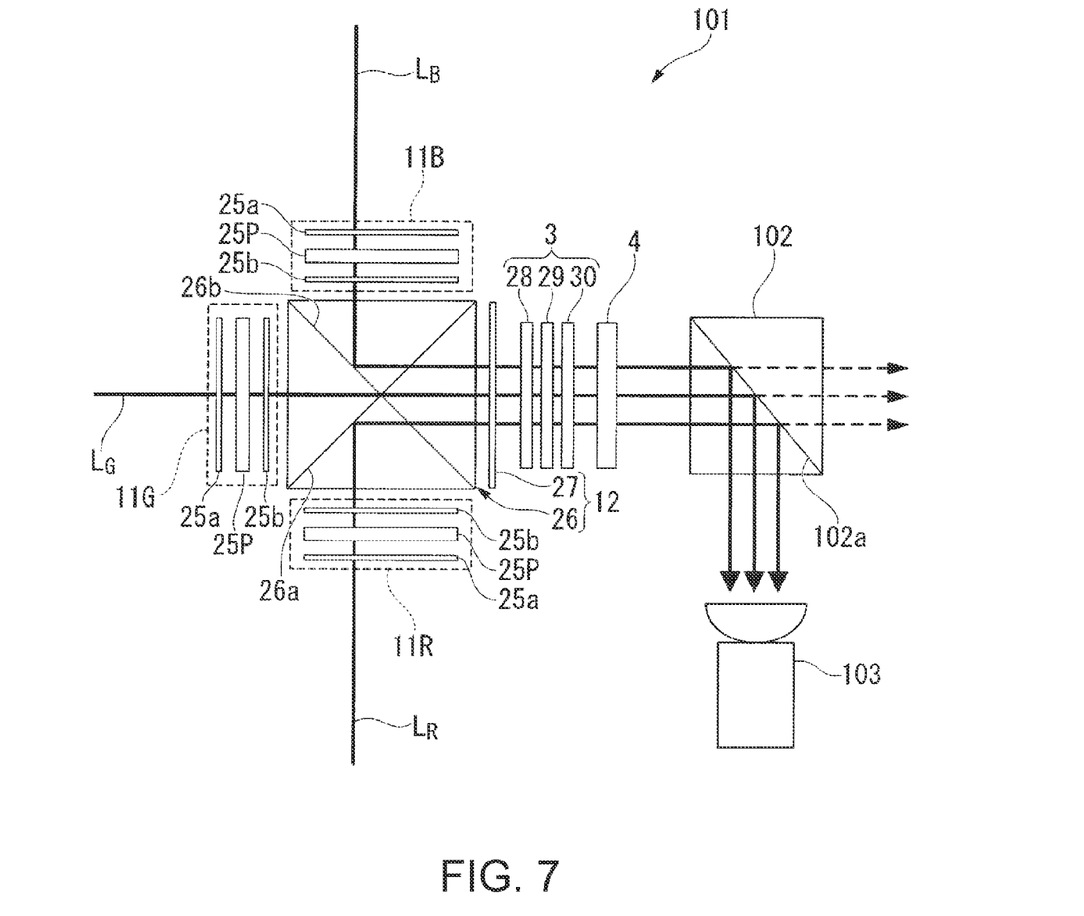
FIG. 7 is a diagram showing an essential part of a projector according to a second embodiment of the invention.

FIG. 7 is a diagram showing an essential part of a projector 101 according to a second embodiment of the invention.

As shown in FIG. 7, in the present embodiment, the projector 101 is different from the projector 1 according to the first embodiment described above in the point that a polarization beam splitter 102 is provided instead of the polarization plate 6, and the point that a light receiving element 103 is provided. Since the other points are substantially the same as those of the configuration described above, the elements substantially the same as those shown in the drawings used in the description of the first embodiment are denoted with the same reference symbols, and the detailed explanation thereof will be omitted.

In the present embodiment, the polarization beam splitter 102 is disposed on the light exit side of the polarization control element 4. On the internal tilted plane of the polarization beam splitter 102, there is disposed a polarization splitting film 102a for transmitting the first image light with the first polarization direction and the second image light with the first polarization direction, and at the same time reflecting the first image light with the second polarization direction and the second image light with the second polarization direction.

The polarization beam splitter 102 transmits the first image light with the first polarization direction and the second image light with the first polarization direction, and then emits the image light toward the projection optical system not shown. The polarization beam splitter 102 reflects the first image light with the second polarization direction and the second image light with the second polarization direction, and then emits the image light toward the light receiving element 103. It should be noted that in FIG. 7, the light path of the image light reflected by the polarization beam splitter 102 is indicated by the solid line, and the light path of the image light transmitted through the polarization beam splitter 102 is indicated by the dotted line for the sake of convenience.

The light receiving element 103 receives the first image light with the second polarization direction and the second image light with the second polarization direction emitted from the polarization beam splitter 102. In other words, the light receiving element 103 receives the image light not projected on the screen 33.

According to the projector 101 related to the present embodiment, the light intensity of the image light making no contribution to the display can be detected.

It should be noted that although in the present embodiment, the explanation is presented citing the example having the polarization beam splitter 102 having a prismatic shape disposed on the light exit side of the polarization control element 4, the invention is not limited to this configuration. For example, the polarization beam splitter 102 can have a plate-like shape instead of the prismatic shape.

Modified Example

Then, a modified example of the control timing of the polarization direction by the polarization control element 4 according to the embodiment described above will be explained using FIG. 8.

Figure 8:
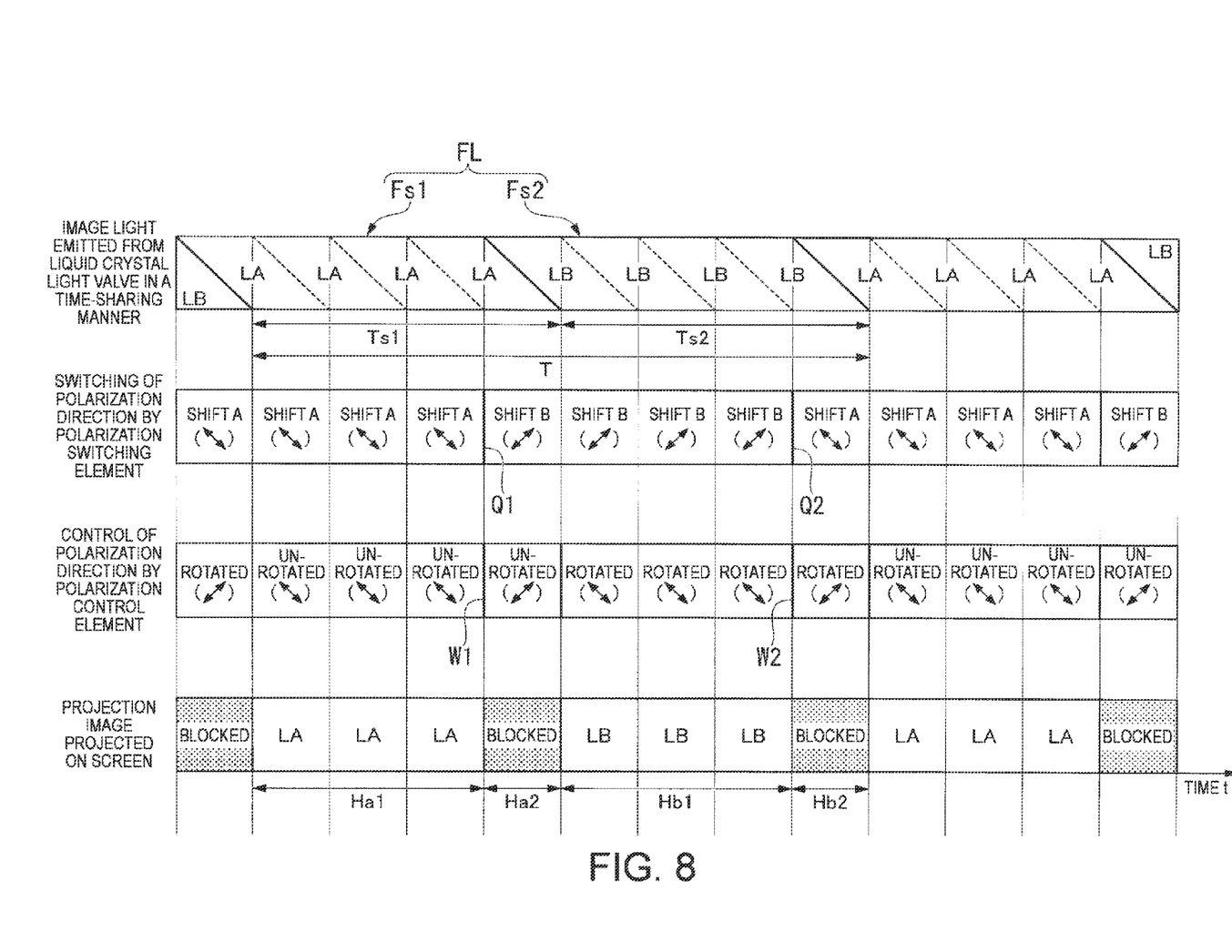
FIG. 8 is a diagram showing a modified example of the control timing of the polarization direction by the polarization control element.

As shown in FIG. 8, in the present modified example, the switching (the second row shown in FIG. 8) of the polarization direction by the polarization switching element 29, and the control (the third row shown in FIG. 8) of the polarization direction by the polarization control element 4 are different from those of the projector according to the embodiment described above. Since the other points (the first row and the fourth row shown in FIG. 8) are substantially the same as those of the configuration described above, the elements substantially the same as those shown in the drawings used in the description of the embodiment described above are denoted with the same reference symbols, and the detailed explanation thereof will be omitted.

As shown in the second row of FIG. 8, the polarization switching element 29 switches the polarization direction of the first image light LA emitted from the liquid crystal light valves to the first polarization direction (the downward right oblique arrow) one unit sub-field earlier than the switching timing of the polarization direction by the polarization switching element 29 according to the embodiment described above (SHIFT A). The polarization switching element 29 switches the polarization direction of the second image light LB emitted from the liquid crystal light valves to the second polarization direction (the upward right oblique arrow) one unit sub-field earlier than the switching timing of the polarization direction by the polarization switching element 29 according to the embodiment described above (SHIFT B).

As shown in the third row of FIG. 8, in the present embodiment, in the first transition period Ha2, the polarization direction of the second image light LB is controlled to be kept in the polarization direction switched by the polarization switching element 29 (UNROTATED). In the second transition period Hb2, the polarization direction of the first image light LA is controlled to rotate 90° with respect to the polarization direction switched by the polarization switching element 29 (ROTATED). It should be noted that in the third row of FIG. 8, the downward right oblique arrow denotes the first polarization direction, and the upward right oblique arrow denotes the second polarization direction.

Also in such control as described above, in each of the first transition period Ha2 and the second transition period Hb2, it is possible to inhibit the image light including both of the first image light LA and the second image light LB from being displayed on the screen 33.

As the control of the polarization direction by the polarization control element 4 according to the present modified example, the following control can be adopted.

The control device 5 performs the control of the polarization direction with the polarization control element 4 in the first transition period Ha2 in sync with the switching timing Q1 from the first polarization direction to the second polarization direction of the polarization switching element 29. The control device 5 performs the control of the polarization direction with the polarization control element 4 in the second transition period Hb2 in sync with the switching timing Q2 from the second polarization direction to the first polarization direction of the polarization switching element 29.

Specifically, in each of the first transition period Ha2 and the second transition period Hb2, the timing W1, W2 at which the control of the polarization direction by the polarization control element 4 starts and the switching timing Q1, Q2 of the polarization direction by the polarization switching element 29 are synchronized with each other. For example, the synchronization is performed by synchronizing the drive signal to be transmitted to the polarization control element 4 via the polarization control drive circuit 32 with the drive signal to be transmitted to the polarization switching element 29 via the polarization switching drive circuit 31.

According to the present modified example, the polarization direction can be controlled in sync with the switching timing of the polarization direction by the polarization switching element 29. Therefore, the blocking of the image light in the transition periods Ha2, Hb2 can surely be performed.

It should be noted that although the projector in the embodiments described above is a transmissive projector, the invention is not limited to this configuration. It is also possible to adopt, for example, a reflective projector. Here, "transmissive" denotes that the light modulation element is a type of transmitting the light as in the case of a transmissive liquid crystal element or the like. Further, "reflective" denotes that the light modulation element is a type of reflecting the light as in the case of a reflective liquid crystal element or the like. Also in the case in which the invention is applied to the reflective projector, the same advantages as in the case with the transmissive projector can be obtained.

Further, although the projector in the embodiments described above is a three-panel projector using three liquid crystal light valves, the invention is not limited to this configuration. For example, the invention can also be applied to a single panel projector using a single liquid crystal light valve.

Further, although in the projector according to any one of the embodiments described above, the liquid crystal light valve is used as the light modulation element, the invention is not limited to this configuration. Any devices for modulating the incident light in accordance with the image information, in general, can be adopted as the light modulation element, and a micromirror light modulation element or the like can also be used as the light modulation element. As the micromirror light modulation element, for example, a digital micromirror device (DMD, a trademark of Texas Instruments) can be used.

The invention can be applied to a front projection projector for performing projection from the side of observing the projection image, and also to a rear projection projector for performing projection from the side opposite to the side of observing the projection image.

Although the preferable embodiment of the invention is hereinabove explained with reference to the accompanying drawings, it is obvious that the invention is not limited to the embodiments described above. The various shapes and combinations of the components described in the embodiment section described above are illustrative only, and can be modified in various ways within the spirit or the scope of the invention in accordance with design needs and so on.

Besides the above, the specific description regarding the shape, the number, the arrangement, the material, the forming method, and so on of each of the components of the projector are not limited to the embodiments described above, but can arbitrarily be modified.

What is claimed is:

1. A projector comprising:
   an image forming device adapted to divide image light, in a time-sharing manner, into first image light corresponding to a first sub-field in which writing of first image data is performed, and second image light corresponding to a second sub-field, which is temporally contiguous to the first sub-field, and in which writing of second image data is performed, and emit the first image light and the second image light;
   a light path switching element adapted to shift a light path of the first image light emitted from the image forming device and a light path of the second image light from each other;
   a polarization control element adapted to control a polarization direction of the first image light to have a first polarization direction in a first display period in which the first image light is emitted after the writing of the first image data is completed, control polarization directions of both of the first image light and the second image light to have a second polarization direction different from the first polarization direction in a transition period until the light emitted from the image forming device is switched from the first image light to the second image light, and control the polarization direction of the second image light to have the first polarization direction in a second display period in which the second image light is emitted after the writing of the second image data is completed;
   a control device adapted to control the image forming device, the light path switching element, and the polarization control element;
   a polarization plate disposed on a light exit side of the polarization control element, and adapted to transmit light with the first polarization direction; and
   a projection optical system adapted to project the first image light with the first polarization direction and the second image light with the first polarization direction emitted from the polarization plate.

2. The projector according to claim 1, wherein
   the light path switching element includes
   a polarization switching element adapted to control the polarization direction of the first image light emitted from the image forming device and the polarization direction of the second image light emitted from the image forming device to have respective predetermined polarization directions different from each other, and alternately switch the polarization direction of the first image light and the polarization direction of the second image light, and
   a birefringent optical element adapted to shift the light path of the first image light with a predetermined polarization direction emitted from the polarization switching element and the light path of the second image light with a predetermined polarization direction from each other.

3. The projector according to claim 2, wherein
   the light path switching element further includes a polarization rotating element disposed on the light exit side of the image forming device, and adapted to rotate a polarization direction of the image light emitted from the image forming device to uniform the polarization direction of the image light into a predetermined polarization direction.

4. The projector according to claim 2, wherein
at least one of the polarization switching element and the polarization control element is a twisted nematic mode liquid crystal element.

5. The projector according to claim 2, wherein
the control device performs control of the polarization direction with the polarization control element in the transition period in sync with switching timing from the first polarization direction to the second polarization direction of the polarization switching element.

6. The projector according to claim 1, wherein
the control device performs control of the polarization direction with the polarization control element in the transition period in sync with timing of start of switching from the first sub-field to the second sub-field.

7. The projector according to claim 1, wherein
the polarization plate absorbs light with the second polarization direction.

8. The projector according to claim 1, wherein the polarization plate reflects the first image light in the second polarization direction and the second image light in the second polarization direction, and further comprising:
a light receiving element adapted to receive the first image light with the second polarization direction and the second image light with the second polarization direction reflected by the polarization plate.

9. The projector according to claim 1, wherein
the image forming device includes
a light source adapted to emit light, and
a light modulation element adapted to modulate the light emitted from the light source based on first image data corresponding to the first sub-field and emit the modulated light as the first image light, and modulate the light emitted from the light source based on second image data corresponding to the second sub-field and emit the modulated light as the second image light.

* * * * *